United States Patent
Kim et al.

(10) Patent No.: US 6,664,355 B2
(45) Date of Patent: Dec. 16, 2003

(54) PROCESS FOR SYNTHESIZING CONDUCTIVE POLYMERS BY GAS-PHASE POLYMERIZATION AND PRODUCT THEREOF

(75) Inventors: Jin Yeol Kim, Anyang (KR); Eung Ryul Kim, Seongnam (KR)

(73) Assignee: Hanyang Hak Won Co., Ltd., Seoul (KR)

( * ) Notice: Subject to any disclaimer, the term of this patent is extended or adjusted under 35 U.S.C. 154(b) by 111 days.

(21) Appl. No.: 09/942,770

(22) Filed: Aug. 31, 2001

(65) Prior Publication Data

US 2003/0045663 A1 Mar. 6, 2003

(51) Int. Cl.$^7$ ................ C08F 128/06; C08F 124/00
(52) U.S. Cl. ................ 526/256; 526/266; 252/500; 428/407; 523/201; 523/206
(58) Field of Search ................ 252/500; 428/407; 523/201, 206; 526/266, 256

(56) References Cited

U.S. PATENT DOCUMENTS 5,520,849 A * 5/1996 Eiffler .................. 252/500

* cited by examiner

Primary Examiner—Robert Harlan
(74) Attorney, Agent, or Firm—Jacobson Holman PLLC

(57) ABSTRACT

Disclosed are a process for synthesizing conductive polymers by gas polymerization and product thereof. The process for synthesizing conductive polymers includes the steps of coating oxidant on a substrate surface in the unit of several microns and drying in a dryer, contacting monomers of a gas phase to cause a polymerization to the surface on the substrate, and cleaning the substrate for removing the non-reacted monomers and the oxidant after the polymerization. The present invention reduces the manufacturing process to 2~3 steps by using the gas polymerization, thereby decreasing the manufacturing cost to two third or more compared with conventional methods. Moreover, the present invention has an excellent thin film property and can freely adjust the electric conductivity.

21 Claims, No Drawings

PROCESS FOR SYNTHESIZING CONDUCTIVE POLYMERS BY GAS-PHASE POLYMERIZATION AND PRODUCT THEREOF

BACKGROUND OF THE INVENTION

1. Field of the Invention

The present invention relates to a process for synthesizing conductive polymers by gas-phase polymerization and product thereof, and more particularly, to a process for synthesizing conductive polymers, which includes the steps of coating oxidant on a substrate surface in the unit of several microns and drying in a dryer, contacting monomers of a gas state to the coated substrate to cause a polymerization to the surface of the substrate, and cleaning the substrate for removing the non-reacted monomers and the oxidant after the polymerization, and to a product manufactured by the process.

2. Background of the Related Art

For several years, heterocyclic conductive polymers, which are in the form of a film, have been applied to electronic parts and various sensors. Polypyrrole and polythiophene of heterocyclo-compounds are easily synthesized and applied in various manners because they have high conductivity and excellent thermal stability. As the synthesis method, an electro-chemical polymerization and a chemical oxidative polymerization are well known. However, as the polymers synthesized by the above methods are not melted or dissolved like other conjugate conductive polymers, it is difficult that the polymers are processed to the film type. Moreover, the polymers synthesized by the chemical oxidative polymerization is formed in a particle type, and the polymers synthesized by the electrochemical polymerization is formed in a thin film type, and thereby they are low in mechanical strength and restricted in real applications.

To solve the above problems, there have been various approaches. As a general method, a method for mixing conductive polymers of a particle type with general polymers and composite materials to increase the processability and physical property has been disclosed. Especially, the electrochemical polymerization is widely known as a method for manufacturing a thin conductive composite film, but it has a difficulty in processability and a continuous process. Recently, a gas phase polymerization method has been disclosed. The gas phase polymerization method can be used to make a polymer film, on which oxidant is dispersed as a host material and contacted with the vapor of monomers to the host material. However, in this case, it takes long reaction time, and there are several problems.

Recently, it has been reported that a conductive film could be used for various purposes, i.e., for semiconductor IC chips, shipping trays or carrier tapes of precise electronic machines, and for displaying materials. Particularly, in the conductive film, a function as electromagnetic wave shielding material is brought out. However, the conductive film is manufactured by a method that the conductive polymers in themselves are polymerized, and then, filmed by an additional coating process. Furthermore, a metal thin film is used as a transparent conductive material by a vacuum evaporation method. They can have an excellent performance as electrode material. However, it is difficult to use because the material requires an additional process, like a vacuum molding, and manufacturing cost is too high.

SUMMARY OF THE INVENTION

Therefore, it is an object of the present invention to provide a process for synthesizing conductive polymers by gas polymerization capable of reducing a manufacturing cost and reducing a manufacturing process in comparison with conventional methods, and capable of having an excellent thin film property and freely adjusting electric conductivity.

It is another object of the present invention to provide conductive polymers manufactured by the above synthesizing process.

It is a further object of the present invention to provide a method for using the manufactured conductive polymers to electric parts, EMI shielding and to a display.

DETAILED DESCRIPTION OF THE PREFERRED EMBODIMENT

A method for synthesizing conductive polymers according to the present invention includes the steps of: coating oxidant on a substrate surface in the unit of several microns and drying in a dryer, contacting monomers of a gas phase with the coated substrate to cause a polymerization, and cleaning the substrate for removing non-reacted monomer and oxidant after finishing the polymerization step.

The substrate is plastic or metal. The plastic material is selected from a group consisting of polyester, polycarbonates (PC), polyamide (PI), polyester sulfone (PES), and amorphous polyester (A-PET or PET-G).

The oxidant is selected from a group consisting of $CuCl_3$, $FeCl_3$, Iron(III) p-toluenesulfonate, and $Cu((ClO_4)_2 \cdot 6H_2O$ (copper(II) perchlorate-hexahydrate). The oxidant is manufactured by dissolving in a single or mixed organic solvent selected from a group consisting of methyl alcohol, 2-butyl alcohol, ethyl cellosolve, ethyl alcohol, cyclohexane, acetone, ethyl acetate, toluene, and methyl ethyl ketone. It is possible to use a single solvent or mixed solvent, in which two to four kinds of solvents, are mixed. For example, the organic solvent, in which methyl alcohol, 2-butyl alcohol and ethyl cellosolve are mixed in a ratio of 7:2:1, 6:2:2 or 5:3:2, is used. The oxidant is manufactured in weight of 0.5~10% to total weight.

The substrate, on which the oxidant is coated, is dried in a drier of 50~80° C. for 0.1~8 minutes. Host polymers besides the oxidant may be added. The host polymers are selected from a group consisting of polybutyl acrylate, polycarbonates, polyester, polyurethane, polyvinyl chloride, polyvinyl alcohol, methyl cellulose, and chitosan. The host polymers are manufactured in weight of 0.5~5% to the total weight.

The monomers are selected from a group consisting of pyrrole, thiophene, furan, selenophene, 2,3-dihydrothio-3,4-dioxin, and their derivatives.

The monomers are vaporized in a vaporizing chamber and contacted on the substrate, on which the oxidant is coated, thereby causing polymerization. The polymerization temperature is 0~100° C. and the polymerization period of time is 10 seconds~40 minutes.

Non-reacted monomers and the oxidant after the polymerization are cleaned with methanol or water.

A series of the steps may be performed in stages and in succession.

The conductive polymers manufactured by the polymerization according to the present invention have the following chemical structure.

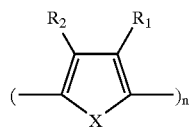

Formula 1 wherein, X is selected from a group consisting of sulfur (S), oxygen (O), selenium (Se) and NH; and R1 and R2 are selected from a group consisting of hydrogen, alkyl group including 3~15 carbons, ether including 3~15 carbons, halogen element and benzene group.

Preferably, the conductive polymers are polypyrrole, polythiophene, polyfuran, polyselenophene and their derivatives, and manufactured in the form of a film of thickness of 0.05~5 microns.

The conductive polymers manufactured according to the present invention may be used for preventing static electricity and electrostatic charge, for shielding electromagnetic wave, and for manufacturing a non-reflecting film having a structure of two or more layers including the polymers. Moreover, the conductive polymers may be used as a functional film of a flat type display or as a transparent electrode layer.

In the present invention, the oxidant is coated thin on the polymers or the metal substrate in the A unit of several tens hundreds, and contacted to the substrate, on which the oxidant is coated, while the monomers of the conductive polymers are made into a vapor of a gas state, so as to cause a direct polymerization, and thereby a conductive coated with thin film can be obtained.

However, in a conventional method, the conductive polymers are prepared by blended with host polymers and coated on the surface of the plastic or metal substrate. The conventional method usually has five or six steps from the synthesis to a final step for obtaining a film. Particularly, in consideration of a manufacturing cost for synthesizing the conductive polymer materials, the conductive polymer manufacturing method according to the present invention can save over two third of the manufacturing cost as going through a simple process having two or three steps.

The conductive polymers manufactured according to the present invention are mainly conjugate polymers having a heterocyclic structure, such as polypyrrole and its derivative, polythiophene and its derivative, polyfuran and its derivative, and polyselenophene and its derivative, and they can be indicated by the chemical formula 1.

As the oxidant, the present invention uses strong Lewis acid, such as $Cu(ClO_4)_2 \cdot 6H_2O$ and $FeCl_3$ as a transient metal compound, and they have an improved adhesive property by using different mixed solvents according to the quality of the substrate. If necessary, host polymer having a solid contents of about 5% or less besides the oxidant may be used.

In this case, available hose polymers are polyurethane, polyvinyl chloride, polyvinyl alcohol, and UV curable acryl polymer blend. According to circumstances, methyl cellulose and chitosan may be used. The polymer materials are generally in a film type having an excellent plasticity, mechanical strength, and high compatibility with monomers like pyrrole, and thus, they are suitable for the host polymers for the gas phase polymerization. If necessary, additives may be used to improve adhesive force.

The electric conductivity of the conjugate polymers manufactured according to the present invention is about $10^2 \sim 10^8$ $\Omega$/square, and the electric conductivity and the mechanical intensity are different according to density, reaction time and temperature. Especially, in case of using pyrrole as the monomer, parameters of a reaction time, reaction temperature, reaction solvent, and oxidant have an influence on a fine structure and the electric conductivity of the synthesized conductive polymers. Moreover, pyrrole has considerably low oxidation potential and high vapor pressure, thereby easily causing chemical reaction in a gas phase.

According to the present invention, the synthesis of the conductive polymers by the gas polymerization can be generated in a temperature range of 0~100° C. The present invention largely includes three steps from synthesis to film forming.

In a first step, the oxidant of 0.5~10% by weight is coated on the surface of the plastic or metal substrate in the unit of several microns. Solvent conditions in this case differ according to kinds of the used substrate, and two to four kinds of organic solvents are mixed and used. The substrate, on which the oxidant is coated, is dried in a heated-air drier at the temperature below 80° C. in consideration of transformation of the oxidant.

In a second step, the polymerized monomers are vaporized into a gas phase and contacted to the substrate, on which the oxidant is coated. At this time, as a method for vaporizing the monomers, there are a method of distilling the monomers in a sealed chamber in the temperature condition of 0~100° C. and a method using a CVD (Chemical Vapor Deposition) device. At this time, the temperature condition and the reaction period of time must be adjusted. For this, it takes from ten seconds to forty minutes, but the period of time generally differs according to the physical property of a target and the kinds of the monomers.

In a third step, after the polymerization, a cleaning step is performed to remove non-reacted monomers and oxidant. At this time, alcohols are generally used as the solvent, and if necessary, the non-reacted monomers and the oxidant may be cleaned with water. The series of steps can be performed in stages or in succession and may be performed as a series working process from the polymerization step to the filming step. The conductive polymer film manufactured according to the present invention maintains pencil strength of about 1–3H and has an excellent adhesive property. Furthermore, the conductive polymer film is stable in alcohol solvents

EXAMPLE 1

$FeCl_3$ as oxidant was dissolved in solvent, in which methyl alcohol, 2-buthyl alcohol, and ethyl cellosolve were mixed in a ratio of 7:2:1, of 2% by weight. The mixture was spin-coated on polyester film, which was the substrate, and dried at the temperature of about 60~70° C. for 2~3 minutes. The polyester film, on which the oxidant was coated, was light yellow color. The substrate, on which the oxidant was coated, was reacted in a CVD chamber designed for generating pyrrole monomer of a saturated state for about 20~30 seconds, and then cleaned with methanol solvent to remove non-reacted materials. The temperature of the reaction chamber was 20° C. As the result, conductive polymer polypyrrole film of transparent brown color was manufactured. The film was about 75% in permeability, about 1~2 microns in thickness, and about $10^4$ $\Omega/cm^2$ in surface resistance. The film was stable in organic solvent, such as isopropyl alcohol, and had electric conductivity, which did not changed even in a heat treatment over 200° C.

EXAMPLE 2

$FeCl_3$ as oxidant was dissolved in solvent, in which methyl alcohol, 2-buthyl alcohol, and ethyl cellosolve were mixed in a ratio of 6:2:2, of 2% by weight. As host polymer, 1% polyvinyl alcohol of molecular mass of 80,000~120,000 was added to a total weight ratio. The mixture was spin-coated on polyester film, which was the substrate, and dried at the temperature of about 60~70° C. for 2~3 minutes. The polyester film, on which the oxidant was coated, was light yellow color. The substrate, on which the oxidant was coated, was reacted in a CVD chamber designed for generating pyrrole monomer of a saturated state for about 20~30 seconds, and then cleaned with methanol solvent to remove non-reacted materials. As the result, transparent conductive polymer polypyrrole film was manufactured. The film was about 75% in permeability, about 1~2 microns in thickness and about $10^4$ $\Omega/cm^2$ in surface resistance. The film was stable in organic solvent, such as isopropyl alcohol, and had electric conductivity, which did not changed even in heat treatment over 200° C. The formed film was high in uniformity and the surface hardness of the conductive polymer thin film was improved.

EXAMPLE 3

$Cu(ClO_4)_2.6H_2O$ as oxidant was dissolved in solvent, in which methyl alcohol, 2-buthyl alcohol and ethyl cellosolve were mixed in a ratio of 6:2:2, of 3% by weight. The mixture was spin-coated on polyester film and dried at the temperature of about 60~70° C. for 2~3 minutes. The substrate, on which the oxidant was coated, was reacted in a CVD chamber designed for generating pyrrole monomer of a saturated state for about 20~30 seconds, and then cleaned with methanol solvent to remove non-reacted materials. As the result, conductive polymer polypyrrole film of transparent brown color was manufactured. The film was about 75% in permeability, about 1~2 microns in thickness and about $10^4$ $\Omega/cm^2$ in surface resistance. The film was stable in organic solvent, such as isopropyl alcohol, and had electric conductivity, which did not changed even in heat treatment over 200° C.

EXAMPLE 4

$FeCl_3$ as oxidant was dissolved in solvent, in which methyl alcohol, 2-buthyl alcohol, and ethyl cellosolve were mixed in a ratio of 6:3:1, of 3% by weight. The mixture was spin-coated on amorphous polyester film and dried at the temperature of about 60~70° C. for 2~3 minutes. The amorphous polyester film, on which the oxidant was coated, was light yellow color. The substrate, on which the oxidant was coated, was reacted in a CVD chamber which was saturated with 2,3-dihydrothio-3,4-dioxin monomer of a saturated state for about 30~40 seconds, and then cleaned with methanol solvent to remove non-reacted materials. The reaction temperature was 45° C. As the result, conductive polymer film of transparent brown color was manufactured. The film was about 75% in permeability, about 1~2 microns in thickness and about 250 $\Omega/cm^2$ in surface resistance, thereby raising electric conductivity. The film was stable in organic solvent, such as isopropyl alcohol, and had electric conductivity, which did not changed even in heat treatment over 200° C.

EXAMPLE 5

In the example 1, $FeCl_3$ as oxidant was manufactured and used in a weight ratio of 5%.

EXAMPLE 6

In the example 1, $FeCl_3$ as oxidant was dissolved in a weight ratio of 3%, dip-coated on a polycarbonate film, and then, dried at the temperature of about 60~70° C. for 2~3 minutes.

EXAMPLE 7

In the example 1, $FeCl_3$ as oxidant was manufactured in a weight ratio of 3%, and solvent, in which methyl alcohol, 2-buthyl alcohol and ethyl cellosolve were mixed in a ratio of 5:3:2, was used.

EXAMPLE 8

In the example 2, as host polymer, methyl cellulose was used.

EXAMPLE 9

In the example 2, instead of $FeCl_3$, $Cu (ClO_4)_2.6H_2O$ was manufactured and used in a weight ratio of 3%. The reaction temperature was 45° C. and the reaction period of time was 20~30 seconds.

EXAMPLE 10

In the example 3, $FeCl_3$ as oxidant was manufactured and used in a weight ratio of 10%, and 2,3-dihydrothio-3,4-dioxin monomer was used. The reaction temperature was 40 minutes.

EXAMPLE 11

In the example 1, $FeCl_3$ as oxidant was manufactured and used in a weight ratio of 6%, and furan monomer was used. The reaction temperature was 30 minutes.

In the present invention, the surface resistance and transmittance were measured using a four point probe and using an UV/VIS spectro-photometer, respectively. Reliability coefficient was measured in a high-temperature and high-humidity condition of 85° C./85% RH and a degree of hardness was measured by pencil strength method. Thermal stability was performed by using a TGA 2050™ spectrometer provided by the Dupont Company in thermal velocity of 10° C./minute and within a measuring range of 30~500° C.

The transparent conductive polymer film manufactured according to the present invention can be manufactured by freely adjusting the electric conductivity from 200 $\Omega/cm^2$ to $10^8$ $\Omega/cm^2$ according to the thickness of oxidant, reaction time, and reaction temperature. This polymer films also can be used as coating material for preventing static electricity and electrostatic charge, and as electrode material of medium resistance range or less. Furthermore, the conductive polymer film can be used for manufacturing a non-reflection film having a structure of two or more layers including the conductive polymer, used in a functional film of a display, and used as molding material since maintaining the electric conductivity up to a stretch of 3~5 times.

As described above, the present invention reduces the manufacturing processes to 2~3 steps by using the gas phase polymerization, thereby decreasing the manufacturing cost to two third or more compared with the conventional method having the manufacturing process of 5~6 steps. Additionally, the present invention can be used for manufacturing various products, for example, electrode materials, molding materials or others, as having the excellent thin film property and can freely adjust the electric conductivity.

What is claimed is:
1. A process for synthesizing conductive polymers by gas-phase polymerization, the process comprising the steps of:

coating oxidant onto a substrate, wherein the substrate comprises material selected from the group consisting of metal, polyester, polycarbonate, polyamide, polyester sulfone, polystyrene, and amorphous polyester;

drying the substrate;

vaporizing monomers:

contacting vaporized monomers to the substrate to cause a polymerization of the monomers and produce conductive polymers; and removing non-reacted monomers and oxidant.

2. The process of claim 1, wherein the oxidant is selected from the group consisting of $CuCl_3$, Iron(III)-toluene sulfonate, Iron(III)-perchlorate, $FeCl_3$, Iron(III)-p-toluenesulfonate, and $Cu(ClO_4)_2 \cdot 6H_2O$.

3. The process claim 1, wherein a solvent used to manufacture the oxidant is selected from the group consisting of methyl alcohol, 2-butyl alcohol, ethyl cellosolve, ethyl alcohol, cyclohexane, acetone, ethyl acetate, toluene, and methyl ethyl ketone.

4. The process of claim 3, wherein the oxidant comprises 0.5 to 10 weight percent.

5. The process of claim 1, wherein host polymers are added to the oxidant.

6. The process of claim 5, wherein the host polymers are selected from the group consisting of polybutyl acrylate, polycarbonates, polyester, polyurethane, polyvinyl chloride, polyvinyl alcohol, methyl cellulose, acryl copolymer, UV or thermal curable acryl resin, MMA-BMA co-polymer resin, and chitosan.

7. The process of claim 5, wherein the host polymers comprise 0.5 to 5 weight percent.

8. The process of claim 1, wherein the monomers are selected from the group consisting of pyrrole, thiophene, furan, 2,3-dihydrothio-3,4-dioxin, and their derivatives.

9. The process of claim 1, wherein the monomers are vaporized in a vaporizing chamber.

10. The process of claim 1, wherein polymerization occurs at a temperature of 0° C. to 100° C.

11. The process of claim 1, wherein polymerization occurs for a period of 10 seconds to 40 minutes.

12. The process of claim 1, wherein the non-reacted monomers and oxidant are removed with methanol.

13. A conductive polymer having the formula:

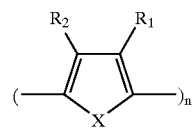

wherein,

X is selected from the group consisting of sulfur (S), oxygen (O), selenium (Se) and NH;

R1 and R2 are selected from the group consisting of a hydrogen, a $C_{3-15}$ alkyl group a $C_{3-15}$ ethyl group a halide, and a benzene group;

the conductive polymer is selected from a the group consisting of polypyrrole, polythiophene, polyfuran, polyselenophene and their derivatives; and the conductive polymer forms as a film having a thickness of 0.05 microns to 5 microns.

14. The conductive polymer of claim 13, wherein the polymer is used for preventing static electricity and electrostatic charge and for shielding electromagnetic waves.

15. The conductive polymer of claim 13, wherein the polymer is used for manufacturing an anti-reflection film having a structure of two or more layers comprising the conductive polymer and one or more electronic parts.

16. The conductive polymer of claim 13, wherein the polymer is used as a functional film for electronic displays or as a transparent electrode layer.

17. The process of claim 1, wherein the non-reacted monomers and oxidant are removed with water.

18. The process of claim 1, wherein the substrate is dried at a temperature less than 80° C.

19. The process of claim 1, wherein the substrate is dried at a temperature of 0° C. to 80° C.

20. The process of claim 1, further comprising the step of forming electrically conductive polymers selected from the group consisting of polypyrrole, polythiophene, polyfuran, polyselenophene and their derivatives.

21. The process of claim 1, further comprising the step of forming a film of conductive polymers, wherein the film has a thickness of 0.05 microns to 5 microns.

* * * * *